June 23, 1970     H. A. SEESSELBERG     3,516,526
CONTROL CIRCUITS FOR ELECTROMAGNETIC
CLUTCH-BRAKE DRIVING DEVICES
Filed June 17, 1968     2 Sheets-Sheet 1

INVENTOR.
Henry A. Seesselberg
BY
Marshall J. Breen
ATTORNEY

WITNESS:
Patrick McDonnell

United States Patent Office 3,516,526
Patented June 23, 1970

3,516,526
CONTROL CIRCUITS FOR ELECTROMAGNETIC
CLUTCH-BRAKE DRIVING DEVICES
Henry A. Seesselberg, South Plainfield, N.J., assignor to
The Singer Company, New York, N.Y., a corporation
of New Jersey
Filed June 17, 1968, Ser. No. 737,543
Int. Cl. F16d 67/06
U.S. Cl. 192—12                                    7 Claims

ABSTRACT OF THE DISCLOSURE

A circuit which does not require mechanical relays is disclosed using silicon controlled rectifiers (SCR's) for controlling manually and/or automatically the starting and stopping of a clutch-brake motor having an electromagnetically actuated clutch and brake. Each clutch and brake winding is connected to a source of full-wave rectified A.C. voltage through its own SCR and selective turn off is effected by capacitor commutation. Momentary overexcitation of both windings is provided by alternative initial discharge therethrough of energy previously stored in respective capacitors. These capacitors are charged through separate individual SCR's from an A.C. voltage of a value higher than the normal D.C. energizing voltage used for continuously exciting the coils. The four SCR's are turned on in pairs, one SCR of each pair closes a circuit connecting the respective winding to the previously charged capacitor and thereafter to the normal D.C. energizing bus. Diode gates prevent adverse interaction between the capacitors and the D.C. bus and provide properly timed energy flow from the D.C. bus to the winding as soon as the capacitor voltage drops to a value slightly below the bus voltage so that there is no discontinuity in the winding excitation. The trigger pulse which turns on one SCR to energize one winding also turns on the other SCR of the pair, which latter SCR connects the capacitor for charging or storing energy which is later released for initially energizing the other winding. A non-voltage release circuit employs a unijunction transistor (UJT) as a relaxation oscillator connected to a D.C. supply having a large capacitor. This oscillator provides triggering pulses to the gate of the SCR which controls excitation of the brake winding. Normally, however, with full line voltage, a transistor, base-biased to saturation, has its emitter-collector circuit connected across the timing capacitor of the UJT oscillator, thus normally shorting the capacitor and preventing oscillation. Upon failure of line voltage, the transistor turns off due to loss of base bias and the timing capacitor charges from the energy in the large capacitor, and the oscillator supplies a triggering pulse to the SCR for energizing the brake coil. The voltage of the previously charged capacitor now connected to the brake winding will, even in the absence of line voltage, supply a high impulse of energy to the brake coil to bring the load quickly to standstill.

BACKGROUND OF THE INVENTION

While circuits are known in the prior art for controlling the initial overexcitation of the windings of electromagnetically actuated clutches and brakes, these have in general heretofore required the use of electromechanical relays which are subject to mechanical failure and inertia difficulties as well as to short life due to contact wear, especially where high peak currents are involved. Special wave-form generators have been suggested for use with special differentiating networks for suitably shaping the current supplied to the windings but these are expensive and suitable only for small-capacity servo-type clutches for positioning and speed control.

It is a primary object of this invention to provide a completely solid-state circuit for controlling an electromagnetically-actuated clutch brake driving device capable of delivering several horsepower to a load.

It is a further object of this invention to provide such a circuit which overcomes the prior art difficulties mentioned above.

It is a still further object of this invention to provide a circuit for automatically exciting the brake winding in the event of failure of line voltage.

Figure 1:
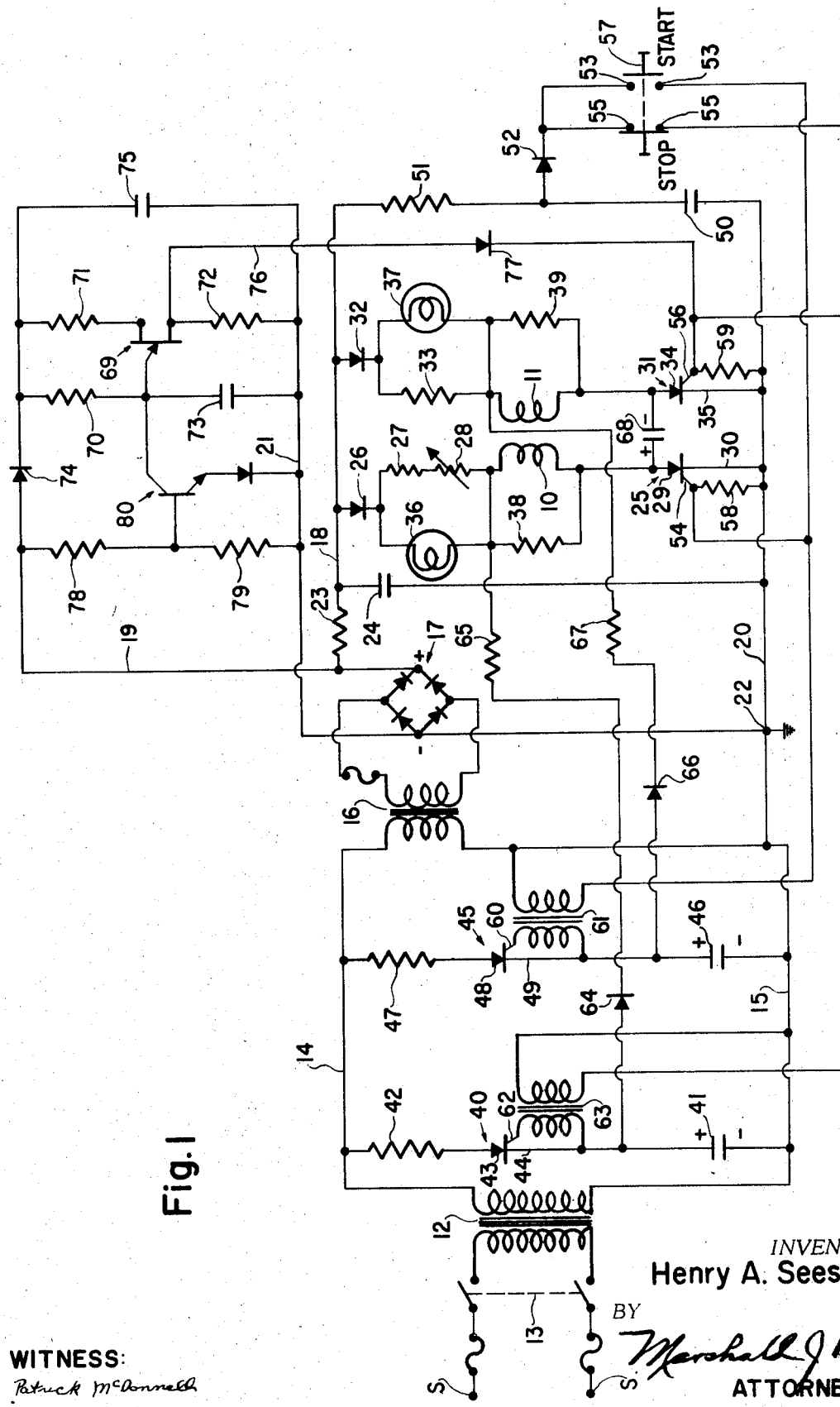

In the drawings, FIG. 1 is a schematic wiring diagram showing a circuit configuration of an embodiment of this invention.

Figure 2:
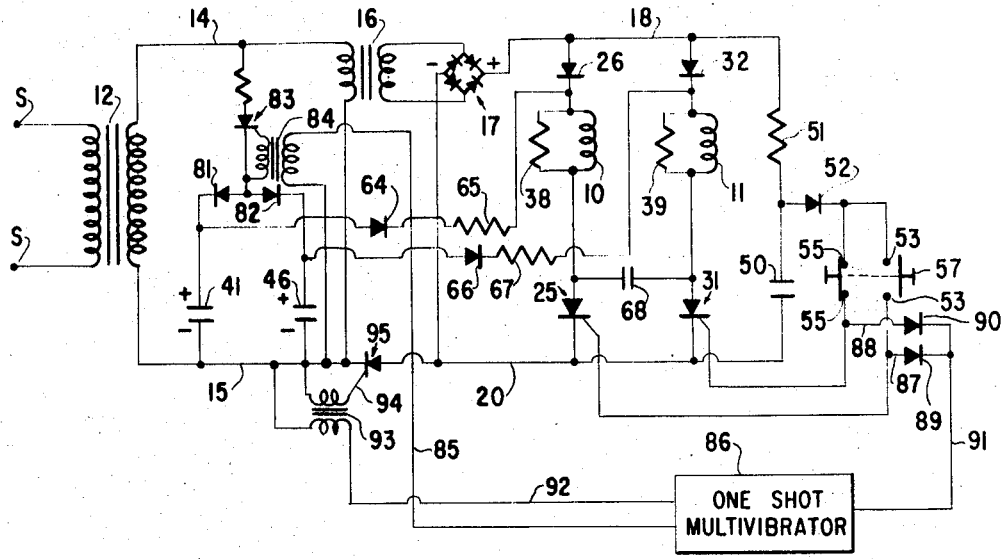

FIG. 2 is a modification of the circuit shown in FIG. 1

DESCRIPTION OF THE INVENTION

The circuit of this invention finds use in clutch-brake driving devices of the type shown and described in the copending U.S. patent application Ser. No. 714,680, filed Mar. 20, 1968. Specifically, the clutch winding 10 and brake winding 11 of the present invention correspond to the elements 36 and 51, respectively, of the above noted application.

It will be seen that the control circuit of this invention may be used with a combined clutch and brake of the type wherein an electromagnetic armature connected to an output shaft is selectively drawn into frictional relation either to a constantly rotating driving member by clutch winding excitation or to a stationary brake surface by brake winding excitation and is clearly exemplified by the clutch and brake shown and described in the U.S. Pat. No. 3,439,249 to which reference may be had for a more complete understanding.

Referring now to FIG. 1 of the drawing, a step-down transformer 12 connected to a source S—S of A.C. voltage through a switch 13, supplies an A.C. voltage to bus pairs 14–15. A second transformer 16 supplies low A.C. voltage to a full-wave bridge rectifier 17 which supplies positive D.C. voltage to busses 18 and 19. Negative D.C. voltage is supplied to busses 20 and 21 which are grounded at 22. In a typical system, the A.C. voltage on busses 14–15 may be 220 volts while the D.C. voltage on busses 18 and 19 may be of the order of 12 volts positive with respect to ground. Resistance 23 and capacitor 24 form a simple RC filter for the voltage on bus 18.

A silicon controlled rectifier (SCR) 25 controls current flow to the clutch winding 10 by the following path: from bus 18, through diode 26, resistance 27, adjustable resistance 28, winding 10, anode 29 and cathode 30 to ground bus 20. Similarly SCR 31 controls the current flow to the brake winding 11 by the following path: from bus 18, through diode 32, resistance 33, winding 11, anode 34 and cathode 35 to ground bus 20.

Lamp 36 is shunted across series resistances 27 and 28 to indicate when current flows in clutch winding 10 and lamp 37 is shunted across resistance 33 to indicate when current flows in brake winding 11.

Damping resistances 38 and 39 are shunted across windings 10 and 11, respectively, to prevent shock-excited current oscillations due to the distributed capacitance and inductance of windings 10 and 11.

SCR 40 controls charging current flow to a storage capacitor 41 through the following path: from bus 14, through resistance 42, anode 43 and cathode 44 into capacitor 41 to bus 15. Similarly, SCR 45 controls charging current flow to a storage capacitor 46 through the following path: from bus 14, through resistance 47, anode 48 and cathode 49 into capacitor 46 to bus 15. Resistances 27, 28, 33, 42 and 47 limit the current to the respective loads during conduction of the respective SCR's.

A capacitor 50 is normally charged from D.C. bus 18 through resistance 51 but may be selectively discharged through diode 52 through closure of contacts 53—53 into the gate 54 of SCR 25, or through closure of contacts 55—55 into the gate 56 of SCR 31. Closure of the contacts 53—53 and 55—55 is controlled manually by a conventional interlocked push button switch 57. Resistances 58 and 59 provide bias stabilization for the SCR's 25 and 31, respectively.

A trigger pulse applied to gate 54 will also be applied to gate 60 of SCR 45 through pulse transformer 61 and a trigger pulse applied to gate 56 will also be applied to gate 62 of SCR 40 through pulse transformer 63. Thus, SCR 25 and SCR 45 are simultaneously triggered into conduction by closure of contacts 53—53. SCR 31 and SCR 40 are simultaneously triggered into conduction by closure of contacts 55—55.

A discharge path for storage capacitor 41 is provided through diode 64, resistance 65, winding 10, SCR 25 (when conducting) to bus 20 and bus 15. Similarly, a discharge path for storage capacitor 46 is provided through diode 66, resistance 67, winding 11, SCR 31 (when conducting) to bus 20 and bus 15. A capacitor 68 is connected between the anodes 29 and 34.

The circuit thus far described provides a completely solid state switching system for selectively energizing clutch winding 10 or brake winding 11 responsively to selective circuit closure and with the provision of initial overexcitation by energy previously stored in capacitors. The operation of this system will now be described.

In the position of the switch 57 shown, contacts 55—55 have been previously closed to trigger SCR 31 and SCR 40 into conduction. Conduction of SCR 40 has already charged capacitor 41 substantially to the peak value of the A.C. voltage of bus 14–15 and SCR 40 has turned off due to A.C. commutation. SCR 31, however, being supplied from D.C. bus 18, is latched into conduction and steady-state current is flowing in the brake winding 11. When the SCR 31 was first triggered into conduction, capacitor 68 was charged with the polarity shown substantially to the D.C. voltage of bus 18 through the following path: bus 18, diode 26, resistance 27, resistance 28, winding 10, capacitor 68, SCR 31 to bus 20. From the above, therefore, in the condition of the circuit shown in the figure, capacitor 41 is charged with polarity shown to the peak value of the A.C. voltage of bus 14–15 and capacitor 68 is charged with polarity shown to the D.C. voltage of bus 18–20.

If now, push button 57 is operated to open contacts 55—55 and close contacts 53—53, capacitor 50 will discharge at the breakover voltage of diode 52 to furnish a trigger pulse directly to the gate 54 of SCR 25 and simultaneously will furnish a trigger pulse through pulse transformer 61 to the gate 60 of the SCR 45. The SCR 25 will be triggered into latched conduction and SCR 31 will be turned off by the reverse voltage applied to its anode-cathode circuit due to the charge on capacitor 68 in a manner well known in this art. Current through brake winding 11 will thus be terminated. The positive voltage initially on capacitor 41 is much greater than the D.C. voltage on bus 18 so that diode 26 is back-biased and does not initially conduct. Capacitor 41 will therefore discharge sending a large initial current impulse through the clutch winding 10 by way of diode 64, resistance 65, winding 10 and SCR 25 to bus 20 and bus 15. This will provide initial overexcitation to winding 10 to effect very rapid acceleration of the armature against the clutch surface.

When the voltage of capacitor 41 drops, due to its discharge, to a value slightly below the voltage of bus 18, diode 26 will become forwardly biased and current will thereafter be supplied to winding 10 from bus 18 at a constant value determined essentially by the adjustment of resistance 28. Diode 64 will now become back-biased and prevent current flow from bus 18 into capacitor 41.

The simultaneous triggering into conduction of the A.C. voltage quickly charges capacitor 46 to the peak value of the A.C. voltage of bus 14–15 after which SCR 45 will automatically turn off due to A.C. commutation as is well known in this art. Further, the conduction of SCR 25 will quickly charge capacitor 68 through coil 11 to a polarity *reversed* from that shown and of a value substantially equal to the D.C. voltage of bus 18. This charging of capacitor 68 does require a current pulse through the brake winding 11 but it is of such short duration that it ceased long before any mechanical response of the brake is possible.

If now, it is desired to quickly stop the clutch-brake driving device, the push button 57 is operated to open contacts 53—53 and close contacts 55—55. Capacitor 50 will discharge through diode 52 to furnish a trigger pulse directly to the gate 56 of SCR 31 and through pulse transformer 63 to the gate 62 of SCR 40. The SCR 31 will be triggered into latched conduction and SCR 25 will be turned off by the reverse voltage applied to its anode-cathode circuit due to the charge on commutating capacitor 68. Current through the clutch winding 10 will thus be terminated. The positive voltage initially on the previously charged capacitor 46 will back-bias the diode 32 so that it does not conduct initially. Capacitor 46 will, therefore, discharge sending a large initial current impulse through the brake winding 11 by way of diode 66, resistance 67, winding 11 and SCR 31 to bus 20 and bus 15. This will provide initial overexcitation to winding 11 to effect very rapid acceleration of the armature against the brake surface.

When the voltage of capacitor 46 drops, due to its discharge, to a value slightly below the voltage of bus 18, diode 32 will become forwardly biased and current will thereafter be supplied to winding 11 from bus 18 at a constant value determined essentially by the value of resistance 33. Diode 66 will now become back-biased and prevent current flow from bus 18 into capacitor 46.

Conduction of SCR 40 will quickly charge capacitor 41 and then turn off. Conduction of SCR 31 will charge capacitor 68 through winding 10 to the polarity shown, but this charging current pulse through the clutch winding 10 is of such short duration that it ceases long before any mechanical response of the clutch is possible. The circuit is then returned to the condition in which it was found and the start-stop operating cycle is completed.

In systems of the present type, where electrical energy is required to energize the brake winding to bring the load to a quick stop, random failure of line voltage is a serious problem because no energy is available and control of the brake is lost.

A "fail-safe" circuit supplemental to that described above and which will automatically energize the brake winding in the event of failure of line voltage will now be described.

A unijunction transistor 69 is connected with resistances 70, 71 and 72 and capacitor 73 to form a relaxation oscillator of the type shown and described on pages 46 and 47 of the General Electric SCR Manual, second edition, 1961, to which reference may be made for a more detailed understanding thereof. By choice of the resistance 70 and capacitor 73 this oscillator can be made to provide an oscillation period preferably of about 12 milliseconds. The oscillator is supplied with a D.C. voltage through rectifier diode 74 and filtered by a large capacitor 75. If now, capacitor 73 is allowed to charge, this oscillator will emit a pulse on line 76 and through diode 77 to the gate 56 of SCR 31 every 12 milliseconds. This will energize the brake winding 11 by discharge therethrough of energy stored in capacitor 46 as above described, even if no voltage exists on bus 18.

However, normally, the full-wave rectified voltage on bus 19 is applied to the bias divider formed by series resistances 78 and 79 which drives transistor 80 into saturation on each half cycle of line voltage. The collector to emitter saturation voltage of transistor 80 is low enough to prevent capacitor 73 from charging so that, with normal line voltage present, no pulses are emitted on line 76. Upon failure of line voltage S—S, transistor 80 will turn off because of loss of base bias. The oscillator circuit still has supply voltage due to the energy stored in capacitor 75, so that capacitor 73 can now charge and, after 12 milliseconds, the emitter to base-one junction of unijunction transistor 69 will breakdown and discharge capacitor 73 through resistance 72 supplying a triggering pulse on line 76, which will trigger SCR 31 into conduction as described above. It will be understood that capacitor 75 can readily be selected so that the RC time constant with respect to the total discharge resistance is much longer than the oscillator period of 12 milliseconds.

Thus, the voltage stored in capacitor 46 is automatically released upon failure of line voltage and supplies high impulse of current to the brake winding 11 to bring the driven load quickly to standstill.

In the circuit of FIG. 1, when one of the storage capacitors 41 or 46 is discharged, subsequent charging thereof is delayed until the next actuation of the switch 57. If this switch is moved from stop to start and back to stop position in rapid succession, for example, there may not be time enough to fully charge capacitor 46. The brake winding 11 would then receive insufficient initial energization to provide a fast stop. FIG. 2 shows a modification to overcome this possible difficulty and provides substantially immediate recharging of either capacitor 41 or 46 following its discharge without waiting for subsequent actuation of switch 57.

Referring now to FIG. 2, wherein parts having the same function as those of FIG. 1 bear the same reference numbers, the storage capacitors 41 or 46 are charged in series with respective diodes 81 and 82 through a single SCR 83 by triggering pulses supplied to pulse transformers 84 or line 85. Line 85 receives a positive pulse output from a one-shot multivibrator 86 when it reverts automatically from its quasi-stable to its stable state. This multivibrator 86 is triggered into its quasi-stable state by pulses supplied by lines 87 and 88 through diodes 89 and 90 respectively to line 91, whenever the switch 57 is actuated. When the multivibrator 86 is thus triggered, a positive pulse is supplied on line 92 and through pulse transformer 93 to the gate 94 of SCR 95 to turn it on and connect bus 20 with bus 15 to complete the discharge path for capacitor 41 through the clutch winding 10 or for capacitor 46 through the brake winding 11. Otherwise the operation of the circuit of FIG. 2 is identical to that of the circuit of FIG. 1. The monostable multivibrator 86 is conventional and may be of the type shown and completely described on page 600 of the textbook, "Pulse and Digital Circuits," McGraw-Hill Book Company, Inc., N.Y., 1956, to which reference may be made for a more complete understanding of its stable and quasi-stable states.

In some cases, a brake winding is not necessary, the driving device being normally mechanically biased to a braked condition. In this situation, the SCR's 31 and 40 may be omitted along with their series connected elements and this represents the simplest form of the invention. However, the clutch winding must now be energized sufficiently to initially overcome the mechanical bias. Thus, the circuit containing both clutch and brake windings represents the preferred form of the invention.

It will be understood that various changes in the details, materials, arrangements of parts and operating conditions which have been herein described and illustrated in order to explain the nature of the invention may be made by those skilled in the art within the principles and scope of the invention as expressed in the claims.

Having thus set forth the nature of the invention, what I claim herein is:

1. A circuit for alternatively energizing an electric clutch winding and an electric brake winding from a common A.C. source comprising: a pair of A.C. busses and a pair of D.C. busses, means adapted to supply said busses from said common A.C. source, a first diode and a first controlled rectifier connected in series with the clutch winding across said pair of D.C. busses, a second diode and a second controlled rectifier connected in series with the brake winding across said pair of D.C. busses, first and second storage capacitors, means for charging said storage capacitors from said pair of A.C. busses, a third diode connected between said first capacitor and said brake winding providing a current discharge path through the brake winding and the second controlled rectifier, a fourth diode connected between said second capacitor and said clutch winding providing a current discharge path through the clutch winding and the first controlled rectifier, a third capacitor connected between the anodes of the first and second controlled rectifiers, means selectively triggering said first and second controlled rectifiers alternatively and means actuated responsively to said triggering means to render said discharge paths effective to discharge said storage capacitors through said selected clutch or brake winding.

2. A circuit according to claim 1 in which the peak value of the voltage applied to the pair of A.C. busses is at least several times greater than the voltage applied to the pair of D.C. busses.

3. A circuit according to claim 1 in which the diodes are poled to supply current to the respective clutch and brake windings in the same direction as the controlled rectifiers.

4. A circuit according to claim 1 in which the means to render the discharge paths effective includes:
  (a) a monostable multivibrator actuated to its quasi-stable state responsively to said triggering means, and
  (b) a third controlled rectifier triggered into conduction by said multivibrator change of state to complete a common connection between the A.C. and D.C. busses.

5. A circuit according to claim 4 in which the means for charging said storage capacitors includes:
  (a) a fourth controlled rectifier triggered into conduction by said multivibrator responsively to its reversion to normal state.

6. A circuit for alternatively energizing an electric clutch winding and an electric brake winding from a common A.C. source comprising: a pair of A.C. busses and a pair of D.C. busses, means adapted to supply said busses from said common A.C. source, a first diode and a first controlled rectifier connected in series with the clutch winding across said pair of D.C. busses, a second diode and a second controlled rectifier connected in series with the brake winding across said pair of D.C. busses, a third controlled rectifier and a first storage capacitor connected in series across said pair of A.C. busses, a fourth controlled rectifier and a second storage capacitor connected in series across said pair of A.C. busses, a third diode connected between said first capacitor and said brake winding providing a current discharge path through the brake winding and the second controlled rectifier, a fourth diode connected between said second capacitor and said clutch winding providing a current discharge path through the clutch winding and the first controlled rectifier, a third capacitor connected between the anodes of the first and second controlled rectifiers, and means selectively triggering said first and third controlled rectifiers and said second and fourth controlled rectifiers alternatively in pairs.

7. A circuit for alternatively energizing an electric clutch winding and an electric brake winding from a common A.C. source comprising:
(a) a pair of A.C. busses,
(b) a pair of D.C. busses,
(c) means adapted to supply said pairs of busses from a comon A.C. source,
(d) a first diode and a first controlled rectifier connected in series with said clutch winding across said pair of D.C. busses,
(e) a second diode and a second controlled rectifier connected in series with said brake winding across said pair of D.C. busses,
(f) first and second storage capacitors,
(g) a third diode connected between said first capacitor and said brake winding providing a current discharge path through the brake winding and the second controlled rectifier,
(h) a fourth diode connected between said second capacitor and said clutch winding providing a current discharge path through the clutch winding and the first controlled rectifier,
(i) a third controlled rectifier connected in separate series with each of said first and second capacitors across the pair of A.C. busses,
(j) a fourth controlled rectifier forming a switchable common connection between the A.C. and D.C. busses to complete the discharge paths,
(k) a monostable multivibrator having a stable and a quasistable state,
(l) means selectively triggering the first and second controlled rectifiers alternatively into conduction, said means also triggering the multivibrator from its stable to its quasi-stable state,
(m) means responsively to the triggered change in state of the multivibrator to trigger the fourth controlled rectifier into conduction, and
(n) means responsively to the reversion of the multivibrator to its stable state to trigger the third controlled rectifier into conduction.

References Cited
UNITED STATES PATENTS 3,379,292   4/1968   Grygera     192—18.2
3,439,249   4/1969   Brendemuehl     318—368

BENJAMIN W. WYCHE III, Primary Examiner

U.S. Cl. X.R.

188—158; 192—84; 317—151